United States Patent [19]

Hashimoto et al.

[11] Patent Number: 4,803,502

[45] Date of Patent: Feb. 7, 1989

[54] IMAGE FORMATION CARTRIDGE AND IMAGE FORMING APPARATUS USING THE SAME

[75] Inventors: Kiyoshi Hashimoto, Ichikawa; Kazuhisa Kimura; Takashi Hatakeyama, both of Yokohama, all of Japan

[73] Assignee: Kabushiki Kaisha Toshiba, Kawasaki, Japan

[21] Appl. No.: 103,129

[22] Filed: Sep. 30, 1987

[30] Foreign Application Priority Data

Sep. 30, 1986 [JP] Japan ............................... 61-232365

[51] Int. Cl.[4] ............................................ G01D 15/16

[52] U.S. Cl. ................................ 346/140 R; 400/126; 400/202.2

[58] Field of Search .............. 346/140 PD, 75, 140 R, 346/76 PH, 76 R; 219/216 PH; 400/120 PH, 126, 197, 202, 202.2, 248; 427/208, 209

[56] References Cited

U.S. PATENT DOCUMENTS 4,608,577 8/1986 Hori .

FOREIGN PATENT DOCUMENTS 0203596 12/1986 European Pat. Off. ............ 400/120
6071260 4/1985 Japan .

*Primary Examiner*—E. A. Goldberg
*Assistant Examiner*—Huan H. Tran
*Attorney, Agent, or Firm*—Cushman, Darby & Cushman

[57] ABSTRACT

An image formation cartridge employed to a printer includes a movable image formation sheet supported between a pair of rotatable shafts, a rotatable ink applying roller unit contacting the image formation sheet and an ink feeding unit for feeding ink from an ink storing container to the ink applying roller unit. The image formation sheet may be wound on one of the pair of rotatable shafts as the shafts rotate in the same direction. Ink may continuously be applied to the image formation sheet through the ink feeding unit and the ink applying roller unit as the shafts rotate.

20 Claims, 10 Drawing Sheets

IMAGE FORMATION CARTRIDGE AND IMAGE FORMING APPARATUS USING THE SAME

BACKGROUND OF THE INVENTION

1. Field of the invention

The present invention relates to image formation cartridges for an image forming apparatus, such as an ink-jet printer. The image formation cartridge typically includes an image formation sheet and an ink apply roller for applying ink fed from an ink tank to the image formation sheet. The present invention also relates to an image forming apparatus employing such an image formation cartridge.

2. Description of the prior art

Ink-jet printers are known as one type of nonimpact printer. The ink-jet printer includes a thermal head and an ink permeable sheet having a large number of small holes. The ink permeable sheet on which ink is applied from an ink tank reciprocates over the head. When the small holes filled with ink have reached the thermal head, the thermal head is energized to be heated quickly in accordance with an image signal. Then ink droplets, corresponding to the holes opposite to the thermal head, are ejected from the ink permeable sheet, thus printing a visible image on a recording sheet.

One example of an ink supply system is shown in U.S. Pat. No. 4,608,577, issued on Aug. 26, 1986 in the name of Ken-ichi Hori, and entitled INK-BELT BUBBLE PROPULSION PRINTER. In this prior art, an endless film 1 is extended between a thermal head member 4 and one end portion of an ink supplying sponge roller 16, as shown in FIG. 7. The other end portion of roller 16 is soaked in ink stored in an ink tank 7. The ink in ink tank 7 is sucked up by roller 16, and is filled or applied to the holes or recess portions of film 1, which contact and pass the surface of roller 16. The ink stored in tank 7 may be supplied to film 1 through sponge roller 16. However, in this system, nonuniformity of the ink supply may occur between one end portion and the other end portion of the sponge roller 16. In particular, it is difficult to uniformly supply the ink to the entire portion of the roller 16 if this system is applied to a line printer type ink-jet printer. This is because an elongated roller is needed to supply ink to the film, and thus the ink may not be sucked uniformly from one end portion to the other end portion of the roller. Therefore, a high printing quality may not be achieved in a line printer using the conventional system.

SUMMARY OF THE INVENTION

It is an object of the present invention to uniformly apply ink to an image formation sheet of an ink jet printing apparatus.

It is another object of the invention to achieve high printing quality in an image forming apparatus using a line printer.

To accomplish the objects described above, there is provided an image formation cartridge comprising a movable image formation sheet having an ink permeable portion and a pair of rotatable shafts for supporting the image formation sheet therebetween. The image formation sheet is wound on one of the rotatable shafts as the shafts rotate. The image formation cartridge further includes a rotatable ink applying roller unit contacting the image formation sheet for applying ink to the image formation sheet and an ink feeding unit associated with the ink applying roller unit for feeding ink to the ink applying roller unit. The above described image formation cartridge may be detachably loaded in an image forming apparatus, such as, e.g., an ink-jet printer.

BRIEF DESCRIPTION OF THE DRAWINGS

The present invention is best understood with reference to accompanying drawings in which;

FIG. 4 (*b*) is a cross-sectional view of the recording section in a recording state of the apparatus;

DETAILED DESCRIPTION OF THE PREFERRED EMBODIMENT

Referring to the accompanying drawings, one embodiment of the present invention will be described.

Figure 1:
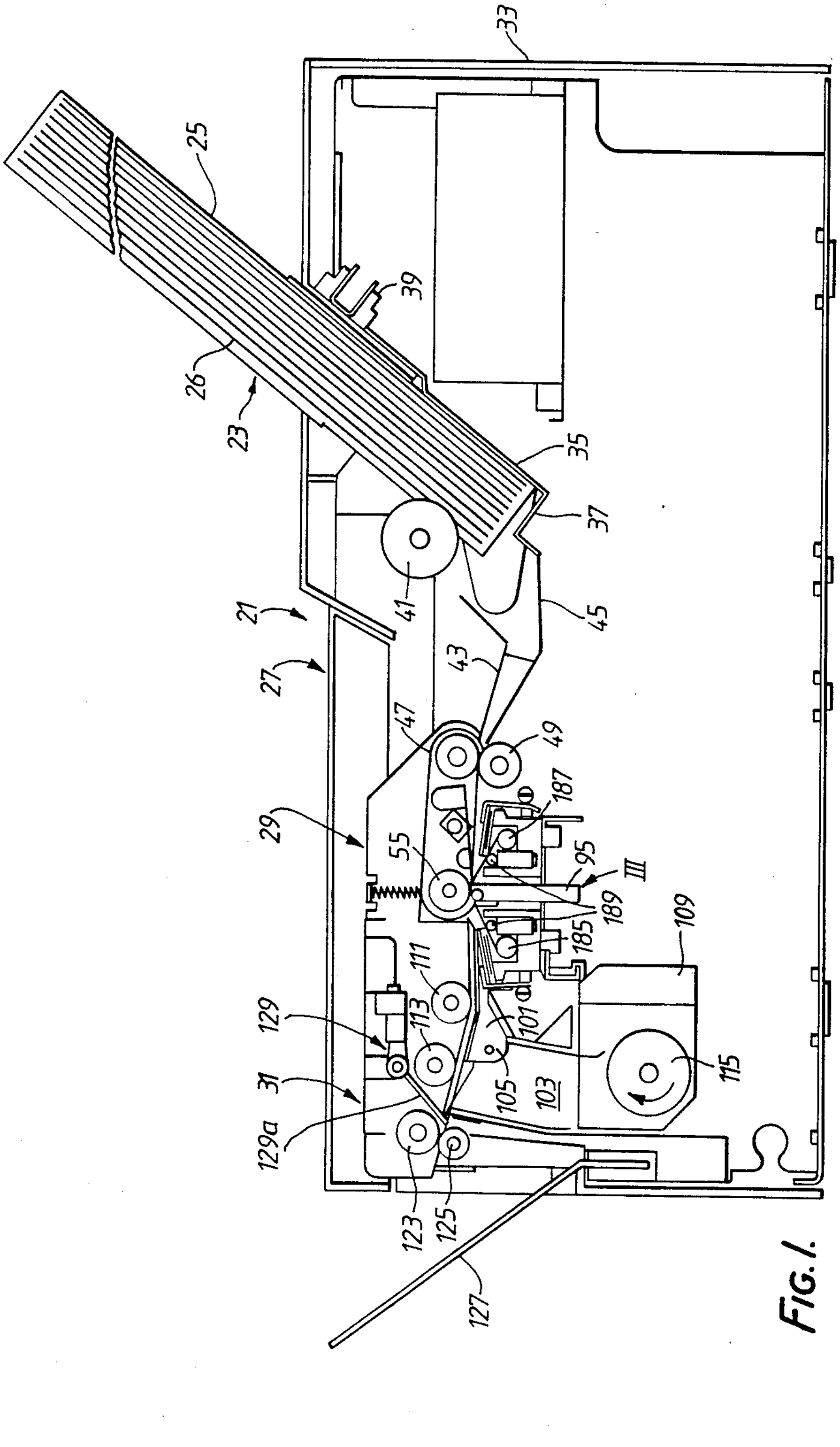
FIG. 1 is a cross sectional side view of an image forming apparatus of one embodiment of the present invention.

FIG. 1 shows a cross sectional side view of one embodiment of the present invention. An image forming apparatus 21 includes a cassette receiving section 23 for receiving a cassette 25 wherein recording sheets 26 are housed, a conveying section 27 for conveying the recording sheets one by one from cassette 25, a recording section 29 for recording an image such as a character on the recording sheet, as a visible image, and a discharging section 31 for discharging the recorded sheet. Each section described above is arranged in a rectangular-shaped base 33.

Cassette receiving section 23 will be described below. Cassette 25 is inserted into cassette receiving section 23 along a slanting guide 35 and is supported by a bottom portion 37 of guide 35. A cassette detecting sensor 39 provided on the rear surface of the middle portion of guide 35 detects the absence or presence of cassette 25. A paper detecting sensor (not shown) detects the absence of a recording sheet in cassette 25.

Conveying section 27 will be described hereafter. When a recording command is supplied from a control device (not shown) to image forming apparatus 21, a paper supply roller 41 rotated by a motor (not shown) takes out the uppermost recording sheet 26 from cassette 25. Recording sheet 26 is guided forward by a pair of paper feed guides 43 and 45.

The front edge of sheet 26 abuts against the rolling contact portion between upper and lower aligning rollers 47 and 49, and is aligned, thus standing by at this position. When a prescribed time has passed from the starting of the paper feed operation, upper and lower aligning rollers 47 and 49 begin to rotate, and the aligned recording sheet is clamped between rollers 47 and 49 to be fed to recording section 29.

Figure 2:
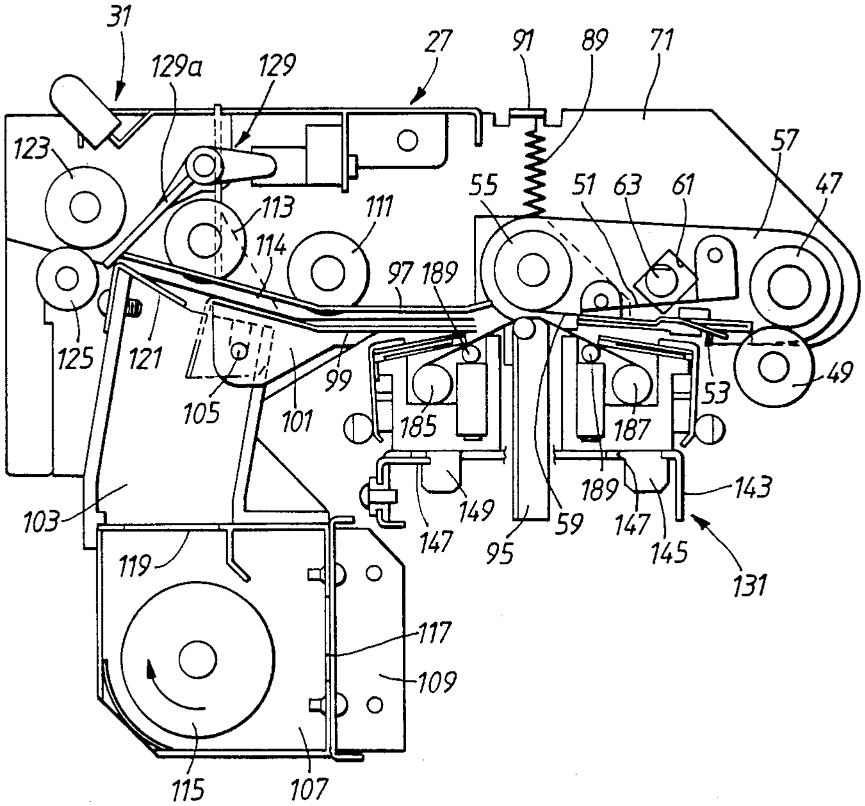
FIG. 2 is an enlarged side view illustrating a recording section and a discharge section of the apparatus shown in FIG. 1.
Figure 3:
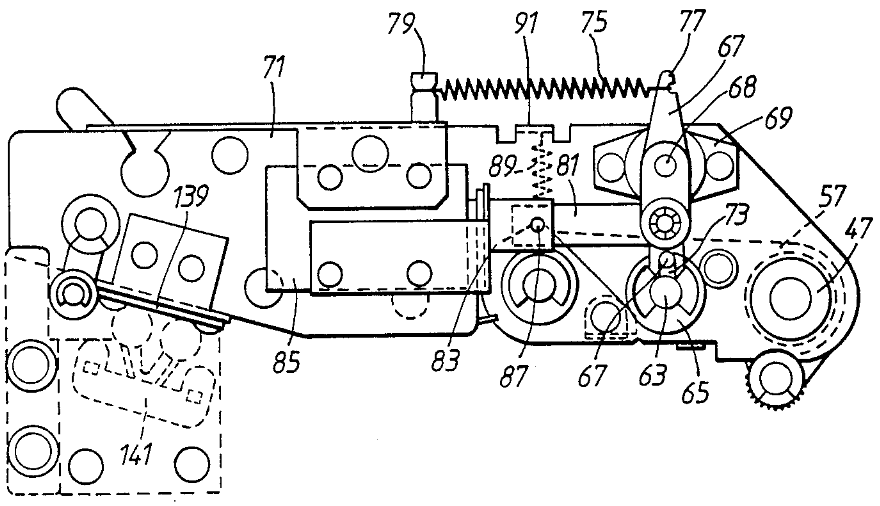
FIG. 3 is a side view of an upper frame portion of the apparatus shown in FIG. 2.

Recording section 29 of image forming apparatus 21 will be described. FIG. 2 is an enlarged side view of recording section 29 and discharge section 31 shown in FIG. 1. FIG. 3 is a side view of an upper frame portion of the recording section and the discharge section shown in FIG. 2. In FIG. 2, a pair of recording guides 51 and 53 and a head roller 55 are attached on an arm 57 rotatable around upper aligning roller 47. A guide element 59 made of thin stainless steel having a 0.1 to 0.2 mm thickness is provided on recording guide 51. The edge portion of guide element 59 is always in contact with the surface of head roller 55 under a prescribed pressure. Arm 57 is provided with a square-shaped hole 61 into which a cam-shaft 63 is inserted. As shown in FIG. 3, a ring 65 having a pin 67 is fixed to one end of cam-shaft 63. Ring 65 integrally rotates with cam-shaft 63. Link 67 is rotatably supported by a shaft 68 of a rotary dumper 69 which is fixed on an upper frame 71. Pin 67 of ring 65 is inserted into a groove 73 formed on the lower portion of link 67. A tension spring 75 is stretched between a notch 77 formed on the other end of link 67 and a projecting portion 79 of upper frame 71. One end of a link plate 81 is connected to the lower portion of link 67. The other end of link plate 81 extending in a left-hand direction in FIG. 3 is connected by a pin 87 to a plunger 83 of a solenoid 85 fixed to upper frame 71. A tension spring 89 is stretched between arm 57 and a projection 91 of upper frame 71.

Figure 4A:
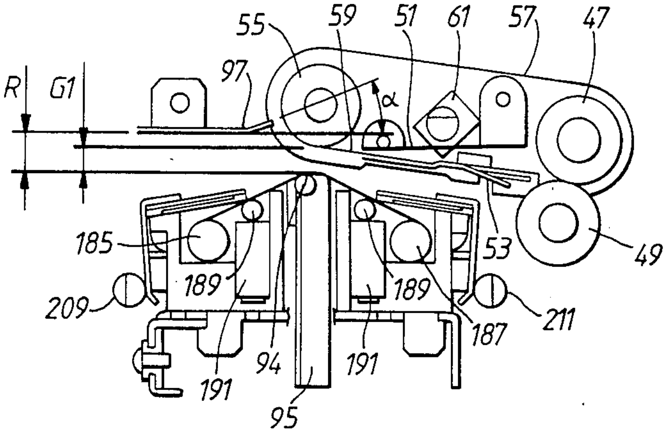
FIG. 4 (*a*) is a cross-sectional view of the recording section in a non-recording state of the apparatus.
Figure 4B:
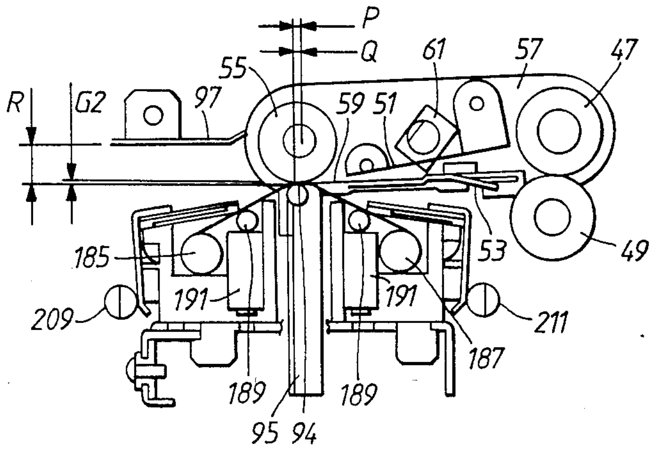

A mechanism for rotating arm 57 will be described. FIG. 4(*a*) is a cross-sectional view of the recording section when arm 57 is rotated to a prescribed upper position (non-recording state). FIG. 4(*b*) is a cross-sectional view of the recording section when arm 57 is rotated to a prescribed lower position (recording state). In the non-recording state, arm 57 is located at the upper position, as shown in FIG. 4(*a*), and a gap between an image formation sheet 93 contacting with heating elements 94 of a thermal head 95 and head roller 55 is maintained at a prescribed value G1. In this embodiment, G1 is set to about 0.75 mm. Under this state, recording sheet 26 is guided between recording guides 51 and 53, and the front edge of sheet 26 is clamped between guide element 59 and head roller 55. Furthermore, the front edge of recording sheet 26 passes through the front edge of guide element 59. Solenoid 85 shown in FIG. 3 is activated a prescribed time after the edge of sheet 26 passes through the front edge of guide element 59. Then, plunger 83 is moved in the left-hand direction in FIG. 3 by solenoid 85, and link plate 81 also is moved in accompaniment with the movement of plunger 83. Link 67 rotates clockwise around shaft 68 of rotary dumper 69 against the tensile force of spring 75. Pin 67 fixed on ring 65 also rotates counterclockwise together with ring 65. Therefore, cam-shaft 63 also rotates counterclockwise, and arm 57 rotates counterclockwise around upper aligning roller 47 to locate the lower position. At this time, the edge of guide element 59 is in contact with image formation sheet 93 which forcibly contacts heating elements 94 of thermal head 95, as shown in FIG. 4(*b*). The outer surface of cam-shaft 63 is disengaged with the square-shaped hole 61. After that, the recording operation to recording sheet 26 begins. During recording, the gap between image formation sheet 93 and guide element 59 is maintained at a prescribed value G2, as shown in FIG. 4(*b*). Therefore, the recording sheet 26 guided by guide element 59 may be separated from image formation sheet 93 by the prescribed value G2. As can be seen in FIG. 4(*b*), the prescribed value G2 is equal to the thickness of guide element 59. In this embodiment, G2 is set to 0.2 mm in view of a printing quality of the apparatus. As shown in FIG. 4(*b*), the offset amount P exists between the center line of head roller 55 and the center line of heating element 94. The front edge of guide element 59 is separated at a distance Q from the center line of heating elements 94. In this embodiment, the offset amount P is set to about 0.7 mm, and the distance Q is set to about 0.3 mm. Guide element 59 is in contact with image formation sheet 93 with a pressing force smaller than the weight of head roller 55. This is because arm 57 is pulled upward by spring 85, as shown in FIG. 3.

Solenoid 85 is deactivated a prescribed time after the recording on recording sheet 26 has been completed. Link 67 rotates counterclockwise around shaft 68 of damper 69 by the tensile force of spring 75, and pin 67 also rotates clockwise.

Ring 65 rotates clockwise a spin 67 rotates. As a result, cam-shaft 63 also rotates clockwise, and the surface of cam-shaft 63 is engaged with square-shaped hole 61. Arm 57 rotates clockwise around upper aligning roller 47, and is again located at the prescribed upper position, as shown in FIG. 4(*a*). At this time, a rapid rotation of link 67 is prevented because of a viscous resistance of rotary damper 69.

Discharge section 31 of the apparatus will be described. In FIG. 4(*b*), recording sheet 26 passing by guide element 59 is directed to upper and lower discharge guides 97 and 99, as shown in FIG. 2. The edge of upper discharge guide 97 opposite to head roller 55 is bent upward at a prescribed angle $\alpha$, as shown in FIG. 4(*a*). A gap between upper discharge guide 97 and image fomation sheet 93 is set to a perscribed value R, as shown in FIGS. 4(*a*) and 4(*b*). The prescribed angle $\alpha$ may be set between 10° and 45°. The prescribed value R of the gap is greater than the prescribed value G1 in this embodiment. According to the above-described construction, recording sheet 26 may be directed between upper and lower discharge guides 97 and 99.

Lower discharge guide 99 is provided with a number of holes (not shown), and is fixed on the upper surface of a duct rotation unit 101, as shown in FIG. 2. Duct rotation unit 101 is arranged on a duct body 103, and is rotatably supported by a shaft 105. Duct rotation unit 101 is located at its prescribed position when the bottom portion thereof is in contact with the right-hand side of duct body 103. Duct body 103 is fixed on a blower device 107, which is fixed on a lower frame 109, as shown in FIGS. 1 and 2.

First upper and lower rollers 111 (only upper roller is shown) engaging with one another, and second upper and lower rollers 113 (only upper roller is shown) engaging with one another are provided in a discharge path 114 of discharge section 31 along the discharge direction to convey recording sheet 26 by clamping with one of the non-recording portions existing on both sides of recording sheet 26.

In the above-described construction, when a fan 115 provided in blower device 107 rotates, air is taken from an air intake opening 117 of blower device 107, and is exhausted to duct body 103 through an exhaust opening 119 of blower device 107. A portion of the air is fed to the upper portion of duct body 103, and the remaining air is fed to the upper portion of duct rotation unit 101. The air fed to the upper portion of duct rotation unit 101 is discharged to discharge path 114 through small holes (not shown) provided in lower discharge guide 99. A discharge guide 121 wherein small holes are provided is fixed to the upper portion of duct body 103. The air fed to the upper portion of duct body 103 also is exhausted to discharge path 114 through the small holes of discharge guide 121. Recording sheet 26 passing through the front edge of guide element 59 is conveyed by rollers 111 and 113 while recording sheet 26 is forcibly pressed to upper discharge guide 97 by the pressure of the air exhausted from the small holes of lower discharge guide 97. At this time, the ink on recording sheet 26 is dried by the exhausted air.

Furthermore, recording sheet 26 is conveyed along upper discharge guide 97 and discharge guide 121, and then is clamped between an upper discharge roller 123 and an lower discharge roller 125 which are in rolling contact with one another. Recording sheet 26 is finally discharged to a tray 127 provided on the left-hand side of apparatus 211, as shown in FIG. 1.

As shown in FIGS. 1 and 2, a discharge detection switch 129 is provided in discharge section 31. The front edge of an actuator **129*a* of detection switch 129 is located at the front edge of upper discharge guide 97, and is across discharge path 114. Actuator 129*a* rotates clockwise when the front edge of recording sheet 26 is passing by the front edge of upper discharge guide 97, and rotates counterclockwise to the original position when the rear edge of recording sheet 26 has passed by the front edge of upper discharge guide 97. As described above, the discharge completion of recording sheet 26 may be detected by discharge detection switch 129**.

Figure 5:
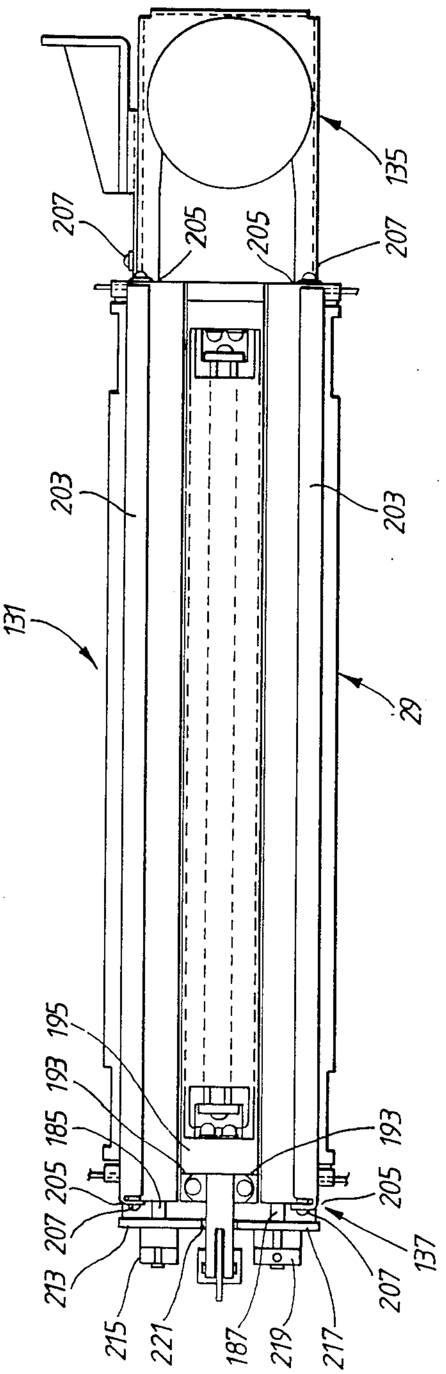
FIG. 5 is a plan view of a cartridge shown in FIGS. 4(*a*) and 4(*b*)

The construction of a cartridge 131 will be described. FIG. 5 is a plan view of cartridge 131. As shown in FIG. 5, cartridge 131 includes recording section 29, an ink supply section 135 and a driving unit 137. When cartridge 131 is loaded at the appropriate position in the apparatus, the coupling between an upper rotary catcher 139 fixed on upper frame 71 and a lower rotary catcher 141 fixed on lower frame 109 shown in FIG. 3 is disengaged.

Upper frame 71 is rotated clockwise around upper aligning roller 47, and this recording section 29 and discharge section 31 are exposed. Cartridge 131 may be loaded in recording section 29, as shown in FIGS. 1 and 2, after duct rotation unit 101 is rotated counterclockwise around shaft 105. As shown in FIG. 3, cartridge 131 is arranged on a supporting base 143 such that four foot elements 145 individually projecting downward from each corner of cartridge 131 are respectively and firmly inserted into the corresponding square holes 147 formed in supporting base 143. After arranging cartridge 131 on supporting base 143, duct rotation unit 101 is rotated clockwise, and upper frame 71 is rotated counterclockwise until upper rotary catcher 139 is engaged with lower rotary catcher 141.

Figure 6:
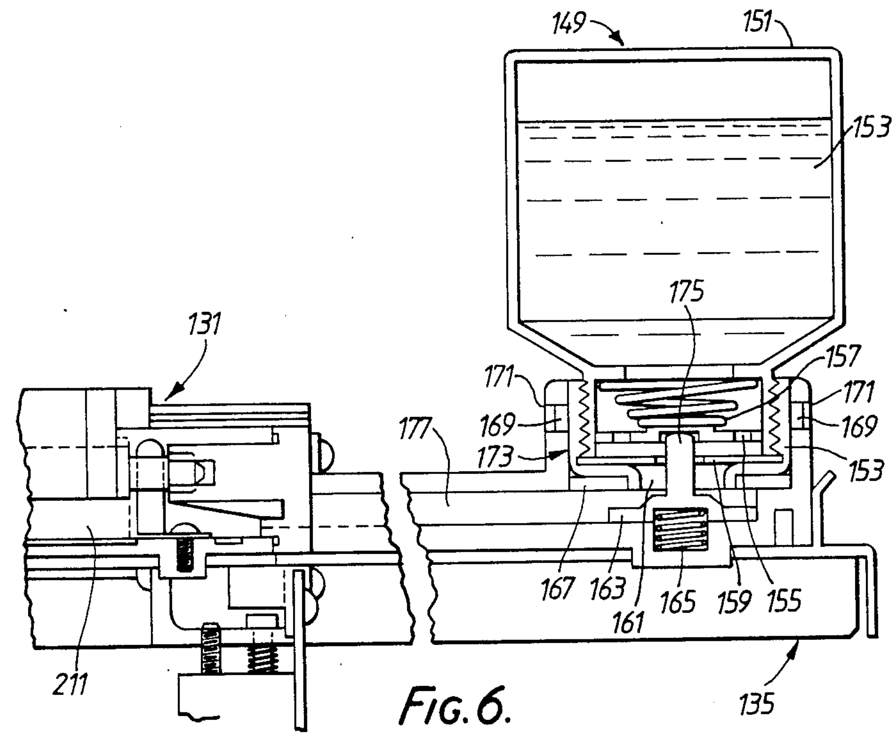
FIG. 6 is a cross-sectional side view of an ink supply tank with an ink supply section of the cartridge shown in FIG. 5.

Ink supply section 135 will be described. FIG. 6 is a cross sectional side view of an ink supply tank 149 when the tank is arranged on ink supply section 135 of cartridge 131. Ink 151 stored in tank 149 may be supplied to cartridge 131 when tank 149 is mounted on ink supply section 135 of cartridge 131. Ink supply tank 149 includes a tank body 151, a cap 153, a valve 155, a conical spring 157 and a sealing plate 159. An ink discharge port 161 is formed in the center of cap 153, which is screwed against and fixed to tank body 151. When ink supply tank 149 is not mounted on cartridge 131, valve 155 is in tight contact with sealing plate 159 by the biasing force of spring 157. No ink is spilled from ink discharge port 161 of cap 153. A valve 163, a compressed spring 165 and a seal 167 are provided in ink supply section 135 of cartridge 131. The ink in ink supply section 135 does not evaportate from ink supply section 135. This is because, valve 163 is in tight contact with seal 167 by the biasing force of spring 165 when ink supply tank 149 is not mounted on cartridge 131.

When ink supply tank 149 is mounted on cartridge 131, a pair of protrusions 169 projecting from the outer surface of cap 153 is inserted into a pair of L-shaped grooves 171 formed in the side surface of an ink-tank mounting portion 173 of ink supply section 135, and the protrusions are rotated along groove 171 to engage with one another. Thus, ink supply tank 149 is firmly mounted on ink supply section 135.

At this time, since the biasing force of conical spring 157 is greater than that of compressed spring 165, valve 155 pushes valve 163 downward through an ink-tank open/close rod 175 projecting from valve 163. When valve 163 has been in contact with the bottom surface of ink-tank mounting portion 173, valve 155 is upwardly pushed by rod 175 of valve 163. As stated above, valve 155 is disengaged from sealing plate 159, and the ink stored in tank 149 flows into an ink supply path 177 through valve 155 of tank 149 and valve 163 of ink supply section 135. It should be noted that the ink does not flow from ink-tank mounting portion 173 to the outside thereof because of the tight contact between cap 153 and sealing plate 159.

When ink is consumed, a prescribed quantity of air corresponding to the consumed amount of ink is taken from the small holes of image formation sheet 93 (described later) into ink supply tank 149 through cartridge 131 and ink supply path 177, thus feeding new ink. Thus ink will not be excessively fed to cartridge 131, and leakage thereof is prevented.

As can be understood from the above-description, since the quantity of the ink in cartridge 131 is kept at a prescribed level, the recording density of ink may be maintained at a prescribed constant value. It should be noted that ink may be refilled when ink supply tank 149 is demounted from ink-tank mounting portion 173 of ink supply section 135, and cap 153 of tank 149 is disengaged from tank body 151.

Figure 7:
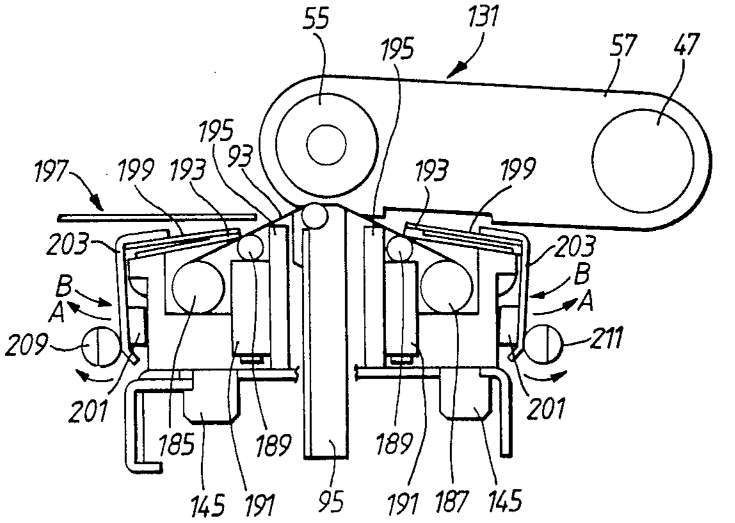
FIG. 7 is a cross-sectional view of the recording section with the cartridge.
Figure 8:
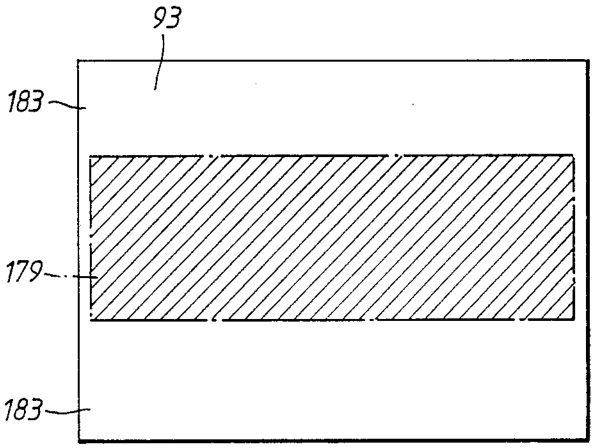
FIG. 8 is a plan view of an image formation sheet.
Figure 9:
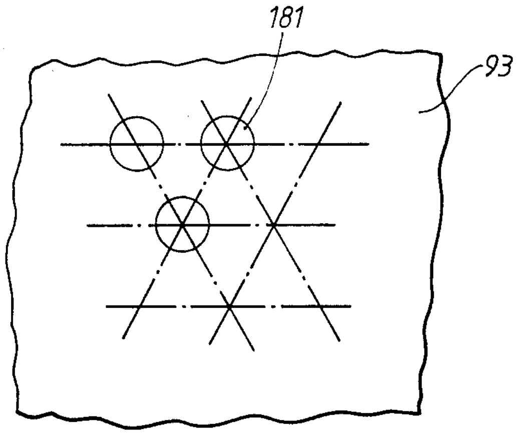
FIG. 9 is an enlarged plan view of a portion of an ink-permeable area of the image formation sheet shown in FIG. 8.

FIG. 7 is a cross-sectional view of the recording section having the cartridge described above. FIG. 8 is a plan view of the image formation sheet, and FIG. 9 is an enlarged plan view of a portion of an ink-permeable area of the image formation sheet shown in FIG. 8.

Image formation sheet 93 is made of a metal such as Nickel or Copper, or a synthetic resin such as polyimide resin. A multilayer made of a plurality of metals or a plurality of synthetic resins may also be used for the image formation sheet. As shown in FIG. 8, a first region 179 having a large number of holes 181 shown in FIG. 9 and second regions 183, which have no holes and are formed at both sides thereof, are formed on image formation sheet 93, as shown in FIG. 8. Hole 181 of second region 183 has a 20 to 30 μm diameter and a 40 to 50 μm pitch, as shown in FIG. 9.

As shown in FIG. 7, one end of image formation sheet 93 is fixed to and wound around a left-hand side film shaft 185, and the other end thereof is fixed to and wound around a right-hand side film shaft 187.

A rotatable ink applying roller 189 is located at each side of thermal head 95, and these are in contact with the rear surface of image formation sheet 93. Both ends of each ink applying roller 189 are supported by a frame (not shown) through a bearing (not shown). Thus, ink applying rollers 189 rotate as image formation sheet 93 moves. The lower surface of each ink applying roller 189 is in contact with each ink feeding element 191. Ink feeding element 191 is made of a porous material which has a good water absorption property and a good applying property, such as e. g., polytetrafluoroethylene felt, formed nitrile rubber, polyvinyl resin, etc.

When cartridge 131 is mounted on supporting base 143, image formation sheet 93 is guided by the pair of ink applying rollers 189, and is in tight contact with thermal head 95 in the center between ink applying rollers 189.

As stated above, since each ink applying roller 189 rotates as image formation sheet 93 moves, and applies ink to image formation sheet 93, the moving resistance between image formation sheet 93 and ink applying rollers 189 may reduce. The life of image formation sheet 93 may also be extended. Wrinkles on image formation sheet 93 occurring when image formation sheet 93 moves may be avoided because of the reduction of the moving resistance, as described above. Furthermore, printing quality may be enhanced. This is because each ink roller 189 is substantially in line contact with image formation sheet 93, and thus ink is uniformly applied to image formation sheet 93.

As shown in FIG. 7, a pair of seal elements 193 is provided in cartridge 131. One end of each seal element 193 is fixed to an ink supply container 195 arranged in cartridge 131. The other end of each seal element 193 is in contact with image formation sheet 93. Each seal element is made of rubber having a water resistant property, such as, e.g., nitrile rubber, styrene-butadiene rubber, etc.

A pressure applying mechanism 197 for applying pressure to the pair of seal elements will be described below. As shown in FIG. 7, pressure applying mechanism 197 includes a pair of plates 199, a pair of leaf springs 201 and a pair of rotatable frames 203. Each plate 199 is made of an elastic thin plate, such as stainless steel, having a 0.1 to 0.4 mm thickness. One end of each plate 199 is fixed on a corresponding rotatable frame 203, and the other end thereof is in tight contact with a corresponding seal element 193. Each leaf spring 201 also is made of an elastic thin plate similar to that of plate 199. One end of each leaf spring 201 is fixed on the corresponding rotatable frame 203, and the other end thereof is in tight contact with the corresponding side wall of ink supply container 195. Each rotatable frame 203 is fixed to ink supply container 195 by collars 205 inwardly projected at right angles from both ends of frame 203, and screws 207, as shown in FIG. 5. A left-hand side cam-shaft 209 and a right-hand side cam-shaft 211 are rotatably supported by lower frame 109. The outer surface of each of cam-shafts 209 and 211 is in contact with the corresponding rotatable frame 203, as shown in FIG. 7. However, the outer surfaces of cam-shafts 209 and 211 do not contact the corresponding rotatable frame 203 when cartridge 131 is not loaded on thermal head 95, or is in a non-recording state. Each rotatable frame 203 is rotated, in the direction indicated by arrow A, by the biasing force of each spring 201 to apply pressure to each seal element 193 through each plate 199. Therefore, each seal element 193 is pushed onto the corresponding ink applying roller 189 through image formation sheet 93. On the other hand, in the recording state, the outer surface of cam-shafts 209 and 211 contact the corresponding rotatable frame 203, and rotates the corresponding rotatable frame 203 in the direction indicated by arrow B against the biasing force of springs 201. Therefore, each seal element 193 elastically contacts image formation sheet 93, as shown in FIG. 7.

Figure 10:
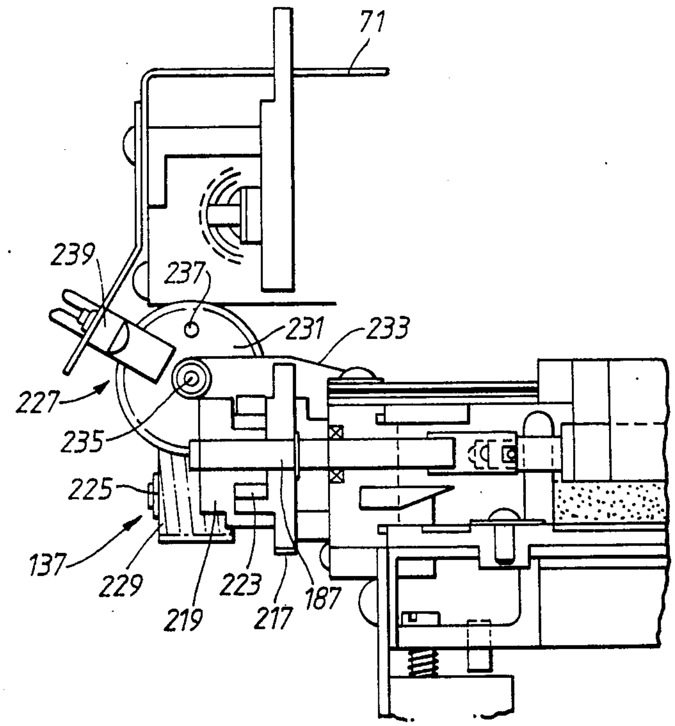
FIG. 10 is a side view of the driving unit of the cartridge.

Driving unit 137 of cartridge 131 will be described. FIG. 10 is a side view of driving unit 137. As shown in FIG. 5, driving unit 137 includes a left-hand side film shaft gear 213 and a left-hand side ring 215. Driving unti 137 also includes a right-hand side film shaft gear 217, a right-hand side ring 219 and an idler gear 211. Left-hand side film shaft gear 213 and left-hand side ring 215 are concentrically fixed to left-hand side film shaft 185. Right-hand side film shaft gear 217 is coupled with right-hand side ring 219 through a torsion spring 223, which is concentrically fixed to right-hand side film shaft 187.

As shown in FIG. 8, since image formation sheet 93 is a thin film having a 10 to 30 μm thickness, image formation sheet 93 always has to be tensed so as not to bend. In order to tense the image formation sheet, idle gear 221 is removed from a stud 225 shown in FIG. 10, and right-hand side film shaft gear 217 is rotated clockwise, as left-hand side film shaft gear 213 is fixed. As a result, torsion spring 223 is wound up, and a torsion moment is created between right-hand side film shaft gear 217 and right-hand side ring 219, thereby tensing image formation sheet 93. When idle gear 221 is remounted on stud 225, right-hand side film shaft gear 217 is coupled with left-hand side film shaft gear 213 through idle gear 221. The tension on image formation sheet 93 is maintained.

A position detecting mechanism for detecting the initial position of the image formation sheet will be described. As shown in FIG. 10, position detecting mechanism 227 includes a worm 229 integrally formed with idle gear 221, and a wheel 231. Wheel 231 is rotatably supported by one end of a holder arm 233 through a pin 235. The other end of holder arm 233 is fixed on the upper surface of ink supply container 195. Wheel 231 is provided with a detection hole 237. Wheel 231 is coupled with worm 229 so that detection hole 237 may be detected by a sensor 239 fixed on upper frame 71 in the initial position of image formation sheet 93. When idle gear 221 makes a turn, worm 229 rotates by one lead, and wheel 231 rotates by one pitch. Therefore, the initial postion of the image formation sheet may be detected even if the image formation sheet is wound several turns around the left-hand side film shaft or the right-hand side film shaft.

Figure 11:
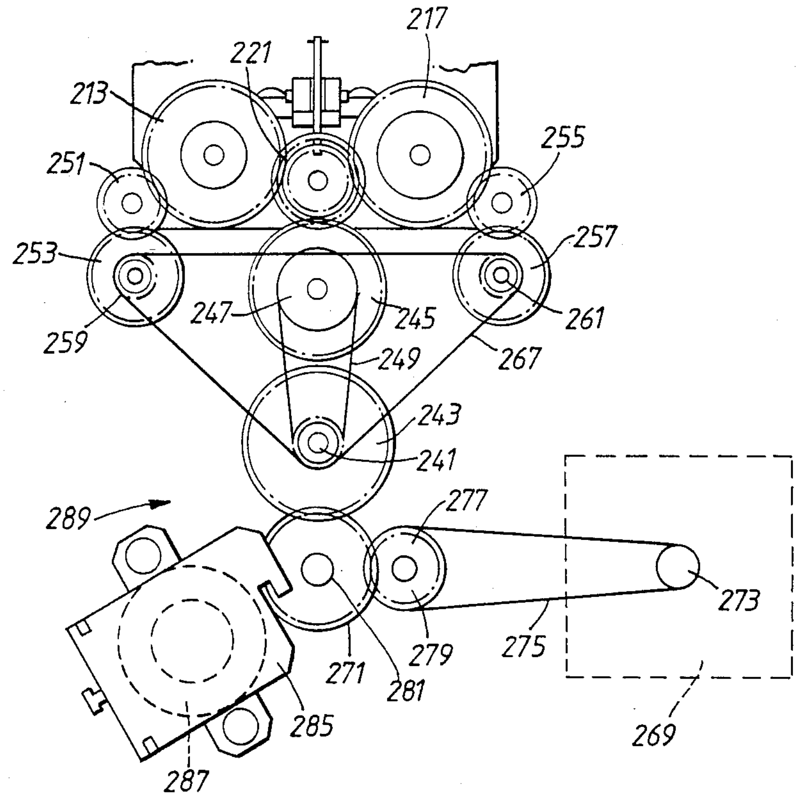
FIG. 11 is a schematic view of the driving mechanism of the cartridge.
Figure 12:
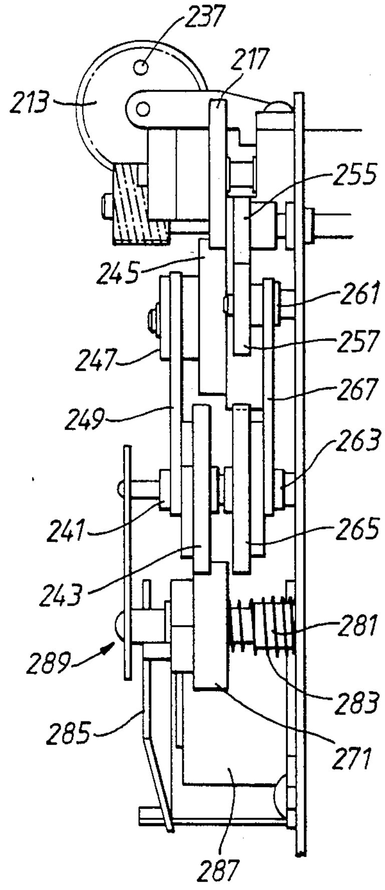
FIG. 12 is a side view of the driving mechanism shown in FIG. 11.

FIG. 11 is a schematic view of a driving mechanism of cartridge 131. FIG. 12 is a side view of the driving mechanism shown in FIG. 11. Left-hand side film shaft gear 213 and right-hand side film shaft gear 217 are linked with a pulley 241 integrally formed with a gear 243 through idle gear 221, a gear 245, a pulley 247 and a belt 249. Left-hand side cam shaft gear 251 is coupled with a gear 253, and right-hand side cam shaft gear 255 is coupled with a gear 257. As shown in FIG. 12, a pulley 259 integrally formed with gear 253 and a pulley 261 integrally formed with gear 257 are linked with a pulley 263 integrally formed with gear 265 through a belt 267. The driving force of a motor 269 is transmitted to a moving gear 271 through a motor pulley 273, a belt 275, a pulley 277 and a gear 279. Moving gear 271 is rotatably provided on a stud 281, and also is moved along the axis of stud 281, as shown in FIG. 12. Moving gear 271 is continuously urged toward an arm 285 of a solenoid 287 by a biasing force of a spring 283 wound around stud 281.

A drive-change mechanism of cartridge 131 will be described. As shown in FIGS. 11 and 12, drive-change mechanism 289 includes gear 243 integrally formed with pulley 241 and gear 265 integrally formed with pulley 263. Drive-change mechanism 289 also includes moving gear 271, stud 281, spring 289 and solenoid 287.

When cartridge 131 is demounted, or image formation sheet 93 is driven, moving gear 271 is located at the leftmost position by the biasing force of spring 289, and is coupled with gear 243, as shown in FIG. 12. The driving force of motor 269 is transmitted to both of left-hand side and right-hand side film shaft gears 213 and 217 through belt 249, pulley 247, gear 245 and idle gear 221.

When left-hand side and right-hand side cam shaft gears 251 and 255 are driven, solenoid 287 is energized. Arm 285 of solenoid 287 pushes moving gear 271 against the biasing force of spring 289, and thus moving gear 271 is moved in the right-hand side direction in FIG. 12. Moving gear 271 is coupled with gear 265 in the right-most position thereof. At this time, the driving force of motor 269 is transmitted to both of cam shaft gears 251 and 255 through belt 267, and each gear 253, 257.

As can be understood from the above-description, since only one motor and one driving mechanism thereof are used for driving the image formation sheet and the cam shafts, the image forming apparatus may be simplified and be made compact.

The operation of the cartridge will be described. As shown in FIGS. 7, 10, 11 and 12, when electric power is supplied to the image forming apparatus, solenoid 287 is energized. Moving gear 271 is coupled with gear 265, and the driving force of motor 269 is transmitted to left-hand side and right-hand side cam shaft gears 251 and 255, as described above. As a result, left-hand side and right-hand side cam shafts 209 and 211 rotate. When each outer surface of cam shafts 209 and 211 pushes each rotatable frame 203, each frame 203 is rotated in the direction indicated by arrow B in FIG. 7, and each seal element 193 is in contact with image formation sheet 93 at its front edge portion. After that, solenoid 287 is deenergized. Moving gear 271 moves toward arm 285 of solenoid 287 by the biasing force of spring 283. Moving gear 271 is coupled with gear 243, and the driving force of motor 269 is transmitted to left-hand side and right-hand side film shaft gears 213 and 217, thereby rotating left-hand side and right-hand side film shafts 185 and 187. Left-hand side and right-hand side film shafts 185 and 187 rotate clockwise in FIG. 7, and thus image formation sheet 93 is wound around right-hand side film shaft 187. At this time, wheel 231 shown in FIG. 10 rotates counterclockwise. Motor 269 stops when detection hole 237 provided in wheel 231 is detected by sensor 239 (initial position). Solenoid 287 is reenergized, and left-hand side and right-hand side cam shafts 209 and 211 rotate. Each rotatable frame 203 rotates in the direction indicated by arrow A, as each cam shaft 209, 211 rotates. As a result, each seal element 193 pushes image formation sheet 93 onto each ink applying roller 189, and thus, the stand-by operation of cartridge 131 is completed.

When a recording command is fed from a control apparatus (not shown) to image forming apparatus 21, solenoid 287 is energized, and each seal element 193 is in contact with image formation sheet 93 at its front edge portion, as stated above. After that, solenoid 289 is deenergized, and left-hand side and right-hand side film shafts 185 and 187 rotate counterclockwise. Image formation sheet 93 is wound around left-hand side film shaft 185. In other words, image formation sheet 93 moves from the right-hand side to the left-hand side. Motor 269 stops when the edge of first region 179 of image formation sheet 93 having a large number of holes 181 has reached a point close to heating elements 94 of thermal head 95. Motor 269 restarts in synchronism with a motor (not shown) for rotating upper aligning roller 47 when recording sheet 26 passes by upper aligning roller 47. A voltage corresponding to a recording image is applied to heating elements 94 to start the recording operation a prescribed time after the front edge of recording sheet 26 has passed by the front edge of guide element 59.

During recording, ink in ink supply container 195 is continuously applied to the surface of image formation sheet 93 opposite to recording sheet 26 by ink applying roller 189 located near right-hand side film shaft 187 through ink feeding element 191. When image formation sheet 93 moves from left-hand side film shaft 185 to right-hand side film shaft 187, ink also must be applied to the surface of image formation sheet 93 by ink applying roller 189 located near left-hand side film shaft 185.

After the recording is completed, the rear end of recording sheet 26 has passed by the front edge of guide element 59. Image formation sheet 93 is further wound around left-hand side film shaft 185.

Motor 269 stops a prescribed time after the completion of recording. At this time, the location of image formation sheet 93 is the initial position when image formation sheet 93 moves towards right-hand side film shaft 187. It should be noted that a continuous recording may be carried out when image formation sheet 93 reciprocates between right-hand side and left-hand side film shafts 187 and 185.

When the recording operation is completed, left-hand side and right-hand side film shafts 185 and 187 rotate clockwise to wind up image formation sheet 93 on shaft 187 until sensor 239 detects detection hole 237 of wheel 231. After the detection of detection hole 237, motor 269 stops. Solenoid 287 is energized, and left-hand side and right-hand side cam shafts 209 and 211 rotate. As stated above, each rotatable frame 203 rotates in the direction indicated by arrow A in FIG. 7, and each seal element 193 pushes image formation sheet 93 onto each ink applying roller 189. The post-recording operation is thus completed.

With the above-described embodiment, since ink is applied to the image formation sheet in a thin film by the rotatable ink applying rollers through the ink feeding elements, as the image formation sheet moves, moving resistance between the image formation sheet and the ink applying rollers is reduced, and the life of the image formation sheet may be extended. Corrugations on the image formation sheet which occur when the image formation sheet moves, may be prevented because of the reduction of moving resistance, as described above. Furthermore, ink is uniformly fed to the ink applying rollers from the ink supply container 195 through the ink feeding elements. The surface of the ink applying roller uniformly contacts the image formation sheet. Therefore, printing quality may be enhanced.

The present invention has been described with respect to a specific embodiment. However, other embodiments based on the principles of the present invention should be obvious to those of ordinary skill in the art. Such embodiments are intended to be covered by the claims.

What is claimed is:

1. A detachable image formation cartridge for an image formation apparatus having a thermal head, comprising:

a movable image formation sheet including an ink permeable portion;

a pair of rotatable shaft means for supporting the image formation sheet therebetween, the image formation sheet being alternatively wound on each of the rotatable shaft pair means as the shaft pair means rotate in corresponding alternate directions;

rotatable ink applying roller means for contacting the image formation sheet and rolling along the image formation sheet as the rotatable shaft means wind the image formation sheet for transferring ink to the image formation sheet; and ink feeding means for drawing ink from a supply thereof and for uniformly applying the drawn ink to the surface of said roller means along at least a portion of the length thereof.

2. A cartridge according to claim 1 further including ink storing container means for storing the supply of ink, the ink feeding means having opposite ends, one end of the ink feeding means contacting the ink applying roller means and the other end thereof extending into the ink storing container means.

3. A cartridge according to claim 2, wherein the ink feeding means includes a porous material for absorbing ink in the ink storing container means.

4. A cartridge according to claim 3, wherein the ink applying means includes a pair of ink rollers, the pair of ink rollers defining a thermal head receiving space therebetween.

5. A cartridge according to claim 4 further including a pair of flexible seal elements each having opposite ends, one end of each seal element being in contact with a corresponding one of the pair of ink rollers.

6. A cartridge according to claim 5 further including pressure applying means biasing the one of each seal element against the image formation sheet for pressing a portion of the image formation sheet against the ink roller.

7. A cartridge according to claim 6, wherein the pressure applying means includes a pair of movable plates, each plate being in contact with one of the seal elements.

8. A cartridge according to claim 7, wherein the pressure applying means further includes urging means for urging each rotatable plate toward the corresponding ink roller.

9. A cartridge according to claim 8, wherein the pressure applying means includes cam means for rotating the plates against the biasing force of the urging means.

10. A cartridge according to claim 9 further including driving means for generating a driving force, the driving means including means for transmitting the driving force of the driving means to one of the pair of rotatable shaft means and cam means.

11. A cartridge according to claim 2 further including an ink tank for fluid communication with the ink storing container means.

12. A cartridge according to claim 11, wherein the ink tank includes valve means for supplying ink to the ink storing container means.

13. A cartridge according to claim 1 further including tension means for applying tension to image formation sheet between the pair of rotatable shaft means.

14. A cartridge according to claim 10, wherein the image formation sheet includes a pair of ink impermeable portions, the ink permeable portion being located between the ink impermeable portions.

15. A cartridge according to claim 14, wherein the image formation sheet has an initial position, and the driving means includes means for detecting the initial position of the image formation sheet.

16. An image forming apparatus wherein an image signal is recorded on a recording sheet as a visible image, comprising:

a thermal head having a plurality of heating elements energizable in response to the image signal;

a cartridge detachably mounted on the apparatus, including a movable image formation sheet having an ink permeable portion, a pair of rotatable shaft means for supporting the image formation sheet therebetween, a pair of rotatable ink applying roller means contacting the image formation sheet for applying ink to the image formation sheet, and a pair of ink feeding means each for uniformly feeding ink to a corresponding one of the ink applying roller means; and means for conveying the recording sheet past the thermal head in proximity to the image formation sheet for transferring the ink from the image formation sheet to the recording sheet to form the visible image when the heating elements are energized.

17. A cartridge according to claim 3 wherein the ink feeding means includes polytetrafluoroethylene felt.

18. A cartridge according to claim 5, wherein the pair of flexible seal elements each includes rubber.

19. A cartridge according to claim 1, wherein the image formation sheet includes a plurality of holes in the ink permeable portion thereof, the diameter of each hole being between about 20 $\mu$m and about 30 $\mu$m.

20. An ink applying system for an ink-jet printing apparatus having a thermal head, comprising:

a movable image formation sheet including an ink permeable portion;

a pair of rotatable shaft means for supporting the image formation sheet therebetween, the image formation sheet being alternatively wound on each of the rotatable shaft pair means as the shaft pair means rotate in corresponding alternate directions;

roller means in co-acting rotatable contact with said image formation sheet for transferring ink to the image formation sheet; and porous ink feeding means for drawing ink from a supply thereof and for uniformly applying the ink to the surface of said roller means along at least a portion of the length thereof.

* * * * *